UNITED STATES PATENT OFFICE.

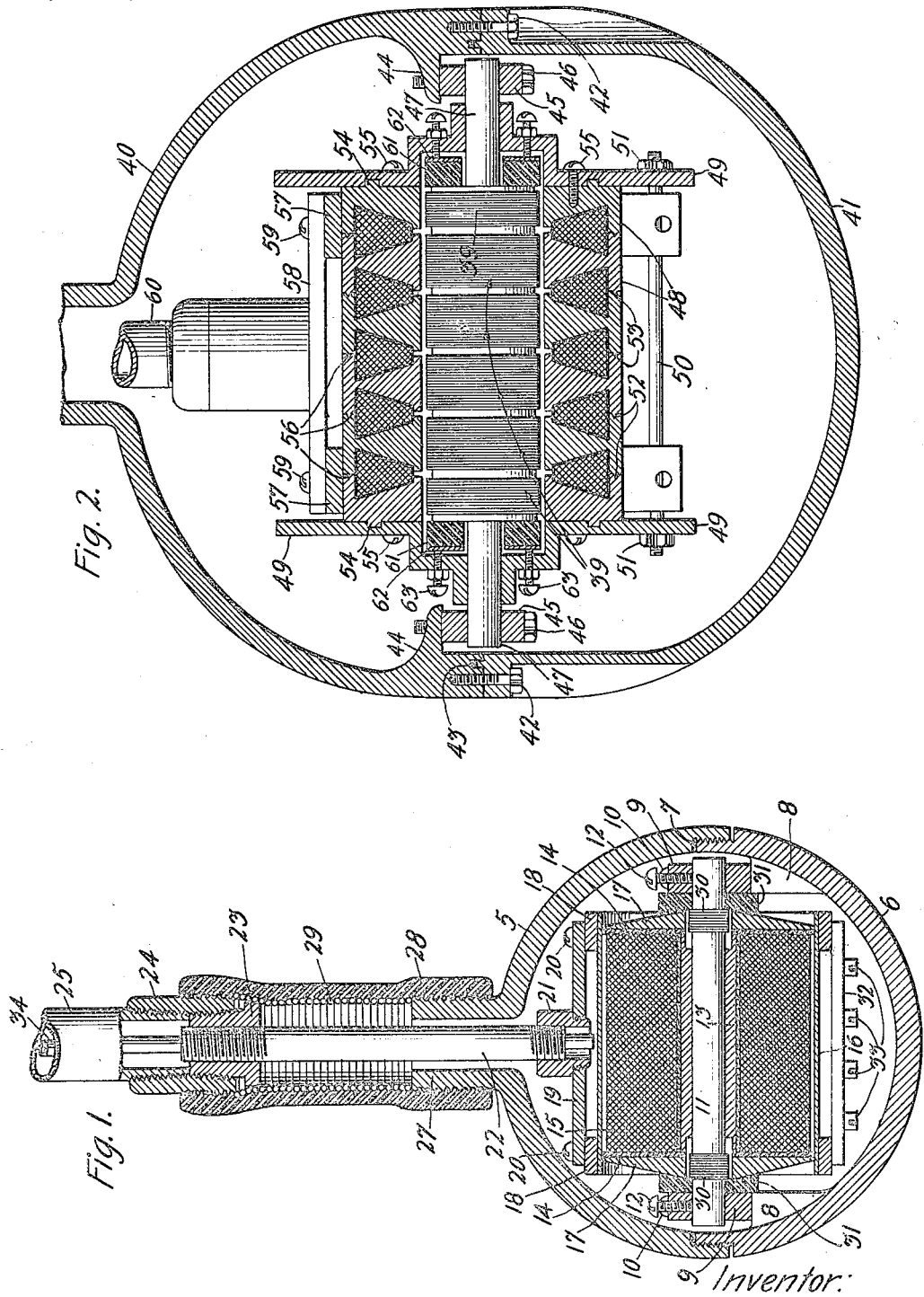

RAYMOND L. WEGEL, OF NEW YORK, N. Y., ASSIGNOR TO WESTERN ELECTRIC COMPANY, INCORPORATED, OF NEW YORK, N. Y., A CORPORATION OF NEW YORK.

SUBMARINE SIGNALING.

1,393,471.  Specification of Letters Patent.  Patented Oct. 11, 1921.

Application filed October 9, 1919. Serial No. 329,453.

*To all whom it may concern:*

Be it known that I, RAYMOND L. WEGEL, a citizen of the United States, residing at New York, in the county of New York, State of New York, have invented certain new and useful Improvements in Submarine Signaling, of which the following is a full, clear, concise, and exact description.

This invention relates to submarine signaling and more particularly to a vibration responsive device adapted for the receiving of vibrations transmitted through the water from a source of submarine signaling vibrations or vibrations set up in the water by the movement of a vessel.

In connection with submarine signaling, it is often desired not only to clearly receive the desired signals but also to determine the direction from whence they come. This is especially true in the case of submarine signaling systems where a signaling device is set in operation for the purpose of warning navigators of danger and also when it is desired to determine the proximity of enemy submarine vessels by means of the vibrations given out by such vessel.

It is the object of the present invention to provide a vibration responsive device particularly suitable for use in detecting vibrations set up in the water.

It is a further object of the invention to provide such a device which can be submerged to considerable depths without affecting its sensitivity and one which is directional to the extent that by rotating it about a vertical axis one can determine, to a certain extent, the direction of the source of sound.

To accomplish these objects and in accordance with a feature of this invention, there is provided a detective device, the moving parts of which are mounted within a suitable container which is adapted to be submerged and to be moved bodily by vibrations occurring in the medium surrounding it.

In accordance with another feature of this invention, there is provided a coil of comparatively large mass suspended within a sphere and prevented from excessive movement by means of damping cushions.

These and other features of the invention may be more clearly understood by reference to the accompanying drawing in which Figure 1 is a sectional view of a device embodying this invention and Fig. 2 is a sectional view of a modified structure employing a somewhat different magnetic circuit for the purpose of increased sensitivity.

Referring now to the drawing, there is shown a metal sphere which, if desired, may be made resonant to vibrations of a frequency substantially that of the vibrations which it is desired to detect and comprising an upper portion 5 and a lower portion 6, these portions being provided with threads, as shown, to permit their being fastened tightly together. In order that the sphere may be absolutely water-tight a gasket comprising a ring 7 of lead or rubber is provided to seal the joint between the two portions. The lower portion of the sphere is provided with bosses 8—8 to which the supporting blocks 9—9 are fastened by means of screws 10—10. These blocks are provided with central openings to support the ends of core 11 and locking screws 12—12 are provided to hold the core in the position desired. Encircling the core 11 is an electromagnetic coil comprising a tubular core 13 of brass or other non-magnetic material, spool heads 14—14 and winding 15. An outer tube 16 of soft iron encircles the winding 15, and end plates 17—17, also of soft iron, are forced in place as shown. The inner diameter of tube 13 is such as to provide sufficient clearance between it and the core to permit free movement of these parts with respect to each other, while the inner diameter of the outer tube 16 is so dimensioned with respect to the diameter of the end plates 17—17 that the latter may be easily forced into the position shown in the drawing. Clamping rings 18—18 are forced over the ends of tube 16 and are joined by bar 19 which is secured to the rings by means of screws 20—20. The central portion of the bar 19 is provided with a central threaded opening adapted to receive a hollow bushing 21. The inner bore of this bushing is threaded to receive the threaded end of the hollow tube 22, the other end of which is also threaded into a bushing 23. A sleeve 24 is threaded internally to engage external threads on bushing 23 and also to engage the threaded end of a pipe 25 by means of which the device is suspended in the water. The upper portion 5 of the sphere is provided with a threaded stem portion 27 about which is forced a flexible tube 28 which is preferably of soft rubber. The other end of this tube passes over a portion of the sleeve 24, thereby providing a flexible coupling between the bushing 23 and the sphere. In order to prevent tube 28 from collapsing when submerged in depths where the hydrostatic pressure becomes appreciable, a coil spring 29 is provided as shown.

The core 11 is provided with coils 30—30 which are preferably connected in series and are so located as to lie approximately in a plane with the end plates 17—17. Cushions 31—31, preferably of sponge rubber, are provided between the end plates 17—17 and blocks 9 to prevent excessive movement between the parts and also to serve as damping means. A terminal block 32 is secured to the clamping rings 18—18 and is provided with terminal screws 33 to which the terminals of the windings of the coils 30—30 and winding 15 are connected. A cable 34 containing the necessary conductors extends from these terminal screws and out through the hollow tube 22 and pipe 25.

When this device is submerged and subjected to vibrations in the water, the sphere is caused to move bodily in accordance with the high frequency vibrations from the source of sound, thus causing corresponding movement of the core 11 which is rigidly secured to the lower portion of the sphere. If the device is in such a position that the core 11 is substantially in line with the direction of the source of sound, relative movement takes place between the core and end plates 17—17 due to the method of suspension of electromagnetic coil 15 and its inertia. As a result of current flowing through the winding 15, a magnetic circuit is provided from one end plate 17 across the air gap to core 11, thence along the core and across the air gap to the other end plate 17 and return by tube 16. The coils 30—30 are placed about the core 11 at the points of maximum fluxdensity, and therefore, movement of the coils 30—30 with respect to the end plates 17—17 produces corresponding changes in the current induced in the coils 30—30, these changes being of sufficient value to be easily noted in a telephone receiver or similar device inserted in circuit with the coils 30—30. Since relative movement between the core and coil 15 only takes place in a direction along the axis of the core, it is obvious that vibrations transmitted in a direction substantially perpendicular to the core will not cause any relative movement between the parts. The sponge rubber cushions 31—31 serve to limit the movement of the end plates with respect to the core, thereby protecting the apparatus from accidental injury, and maintaining these parts in the correct position for maximum sensitivity.

In the device shown in Fig. 2, the principle of operation is substantially the same as in Fig. 1 but a somewhat different and more efficient magnetic circuit is provided. In this device a metal sphere is provided comprising an upper portion 40 and a lower portion 41, these parts being clamped together by means of screws 42—42 and a sheet-lead gasket 43 is provided to insure that the seal is water-tight. Shouldered bracket portions 44—44 are provided in the upper portion 40 to which mounting blocks 45—45 are secured by means of screws 46. The blocks 45 are provided with central openings to receive the reduced end portions of the core 47.

Upon the central or enlarged portion of the core are wound a plurality of coils 39—39. These coils are connected in series but adjacent coils are wound in opposite directions in order to provide the desired magnetic effect as will be described hereinafter. Surrounding the central portion of the core are the pole pieces which comprise a plurality of rings 48 of soft iron clamped between the end plates 49—49 by means of bolts 50 and suitable nuts 51. The pole pieces 48 are provided on one side with V projections 52 and on the other side with corresponding slots 53 to facilitate securing the parts together in proper alinement. The end pole pieces are provided with annular projections 54 adapted to register with similar slots in the end plates 49—49. These end plates are also secured to the end pole pieces by means of screws 55. The pole pieces 48 are so formed as to provide space for the field coils 56 which are thus embedded in the pole pieces upon tightening of the bolts 50. Clamping rings 57—57 are sprung over the pole pieces at each end and a supporting plate 58 is attached to these rings by means of the screws 59—59. Secured to the supporting plate 58 is a hollow tube 60 by means of which the coil is supported and which corresponds to the tube 22 of Fig. 1. Adjacent field coils 56 are wound in opposite directions and all are connected together in series. Upon the flow of direct current through the field windings, a plurality of magnetic circuits are provided cutting the various windings on the core in such a manner as to induce electromotive forces in the coils 39, which are of the same polarity, and thus produce a maximum electromotive force in the circuit in which these coils are included. The end plates 49—49 are provided with hub portions having openings of suitable dimension to permit the free movement of the reduced portions of the core 47 therethrough. Abutting against the enlarged portion of the core at both ends are the cushions 61—61 preferably of sponge rubber which prevent excess movement of the parts and also maintain the core in the correct position with respect to the pole pieces for the most efficient operation. Metal washers 62—62 are provided adjacent the cushions 61—61 and adjusting screws 63—63 are adapted to thread into the hub portions of end plates 49—49 to engage the washers 62—62, thereby providing an easy method of adjusting the position of the core with respect to the pole pieces. Upon the device being subjected to the effect of vibrations in the water, the sphere is set in vibration, thereby causing corresponding oscillation of the core 47 upon which the coils 39—39 are rigidly secured. The field coils 56 and the pole pieces 48 are not connected directly to the sphere and because of their relatively large mass their inertia prevents them from moving with the core 47. The coils 39—39 are therefore moved back and forth through the various magnetic circuits causing induced currents which, on account of the manner in which the coils are connected, are additive and may be easily detected in a telephone receiver or similar indicating device.

What is claimed is:

1. A vibration responsive device comprising a container adapted to be submerged, and a vibration responsive element mounted therein, said element comprising electromagnetic means responsive to movement of the container in one direction and unresponsive to movement of the container in another direction.

2. A vibration responsive device comprising a container, and a vibration responsive element mounted therein, said element comprising electromagnetic current-generating means responsive to movement of the container in one direction to generate an electric current and unresponsive to movement of the container in a direction at right angles to said first direction.

3. A vibration responsive device comprising a container adapted to be submerged and to move bodily in response to vibrations transmitted through the medium in which it is submerged, and an electromagnetic vibration responsive element within said container responsive to movement of the container in one direction and unresponsive to movement of the container in another direction.

4. A vibration responsive device comprising a container, and a vibration responsive element mounted therein, said element including a member rigidly secured to the container, a coil secured to said member and adapted to vibrate therewith, and a second member adapted to move relatively to said first member upon movement of the container.

5. A vibration responsive device comprising a container adapted to be submerged, an energizing coil of comparatively large mass mounted within and supported independently of said container, and a coil secured rigidly to the container within the magnetic field of said energizing coil and adapted to vibrate with said container.

6. A vibration responsive device comprising a container adapted to be submerged, an energizing coil of comparatively large mass suspended within the container and adapted to move independently thereof, and a second coil rigidly secured to the container and within the magnetic field of said energizing coil.

7. A vibration responsive device comprising a container adapted to be submerged, an energizing coil of comparatively large mass suspended within the container and adapted to move independently thereof, a magnetic core for said coil rigidly attached to the container, and a second coil rigidly secured to and encircling said core within the magnetic field of the energizing coil.

8. A vibration responsive device comprising a sphere, means for supporting said sphere under water, an energizing coil within the sphere, means for supporting said coil independently of the sphere, and a second coil rigidly secured to the sphere and within the magnetic field of the energizing coil.

9. A vibration responsive device comprising a sphere adapted to be submerged under water, an energizing coil within the sphere and mounted independently thereof, a magnetic core extending through said energizing coil and rigidly secured to the sphere, and a plurality of windings encircling said core within the magnetic field of said energizing coil.

10. A vibration responsive device comprising a sphere, an energizing coil suspended within the sphere and mounted independently thereof, a core for said energizing coil rigidly secured to said sphere, a second coil encircling said core within the magnetic field of said energizing coil, and means for limiting the relative movement between said energizing coil and core.

11. A vibration responsive device comprising a sphere, an energizing coil suspended within the sphere and mounted independently thereof, a core for said energizing coil rigidly secured to said sphere, a second coil encircling said core within the magnetic field of said energizing coil, and a cushion of sponge rubber to limit the movement of the energizing coil with respect to the core.

12. A vibration responsive device comprising a two-part sphere adapted to be submerged under water, a magnetic core rigidly secured to said sphere, an energizing coil suspended within said sphere and independently thereof, said energizing coil comprising a plurality of sections located between annular pole pieces, and a plurality of coils encircling said core and in alinement with said pole pieces.

13. A vibration responsive device comprising a two-part sphere adapted to be submerged under water, a magnetic core rigidly secured to said sphere, an energizing coil suspended within said sphere and independently thereof, said energizing coil comprising a plurality of sections located between annular pole pieces, and a plurality of coils encircling said core and in alinement with said pole pieces, adjacent sections being wound in opposite directions.

14. A vibration responsive device comprising a two-part sphere adapted to be submerged under water, a magnetic core rigidly secured to said sphere, an energizing coil suspended within this sphere and mounted independently thereof, said energizing coil comprising a plurality of sections located between annular pole pieces, a plurality of coils encircling said core and in alinement with said pole pieces, and means for limiting the movement of the energizing coil with respect to the core.

15. A vibration responsive device comprising a two-part sphere adapted to be submerged under water, a magnetic core rigidly secured to said sphere, an energizing coil suspended within the sphere and mounted independently thereof, said energizing coil comprising a plurality of sections located between annular pole pieces, a plurality of coils encircling said core and in alinement with said pole pieces, and a sponge rubber cushion for limiting the movement of the energizing coil with respect to the core.

16. A vibration responsive device comprising a two-part sphere adapted to be submerged under water, a magnetic core rigidly secured to said sphere, an energizing coil suspended within this sphere and mounted independently thereof, said energizing coil comprising a plurality of sections located between annular pole pieces, a plurality of coils encircling said core and in alinement with said pole pieces, a sponge rubber cushion for limiting the movement of the energizing coil with respect to the core, and means coöperating with said cushion to adjust the position of the coil with respect to the core.

In witness whereof, I hereunto subscribe my name this 7th day of October A. D., 1919.

RAYMOND L. WEGEL.